United States Patent [19]

Uesugi et al.

[11] Patent Number: 5,102,224
[45] Date of Patent: Apr. 7, 1992

[54] APPARATUS FOR MEASURING THREE-DIMENSIONAL CURVED SURFACE SHAPES

[75] Inventors: Mitsuaki Uesugi; Masaichi Inomata, both of Kanagawa, Japan

[73] Assignee: NKK Corporation, Tokyo, Japan

[21] Appl. No.: 496,336

[22] Filed: Mar. 20, 1990

[30] Foreign Application Priority Data

Apr. 5, 1989 [JP] Japan .................................. 1-84875

[51] Int. Cl.⁵ ............................................. G01B 11/24
[52] U.S. Cl. .................................................... 356/376
[58] Field of Search ................................ 356/1, 376

[56] References Cited

U.S. PATENT DOCUMENTS

| | | | |
|---|---|---|---|
| 3,692,414 | 9/1972 | Hosterman et al. | 356/1 |
| 4,472,056 | 9/1984 | Nakagawa et al. | 356/376 |
| 4,794,262 | 12/1988 | Sato et al. | 250/560 |

FOREIGN PATENT DOCUMENTS

| | | |
|---|---|---|
| 1423606 | 10/1968 | Fed. Rep. of Germany . |
| 2911739 | 10/1980 | Fed. Rep. of Germany .......... 356/1 |
| 0196608 | 10/1985 | Japan . |
| 60-200141 | 10/1985 | Japan . |
| 8607443 | 12/1986 | World Int. Prop. O. . |

OTHER PUBLICATIONS

"Method and Its Trial Instrumentation for 3-D Shape Measurement" by Araki et al.
Handbook for Image Processing, published Jun. 6, 1987 by Shokodo Co., Ltd., pp. 392–407.

Primary Examiner—Richard A. Rosenberger
Attorney, Agent, or Firm—Michael N. Meller

[57] ABSTRACT

A three-dimensional curved surface shape measuring apparatus of the slit light linear scanning type. In accordance with a composite image $u(x', y')$ produced by image composing means when a slit light is scanned over a surface of an object to be measured, a measured value or computed value $u_o(x', y')$ of a composite image with respect to a reference plane, a light projecting angle $\theta$ to the reference plane and a reference plane-television camera distance a, a necessary computational processing is performed to determine a three-dimensional curved surface shape $f(x, y)$ of the surface of the object which is free of any distortions due to a perspective effect of the television camera.

4 Claims, 3 Drawing Sheets

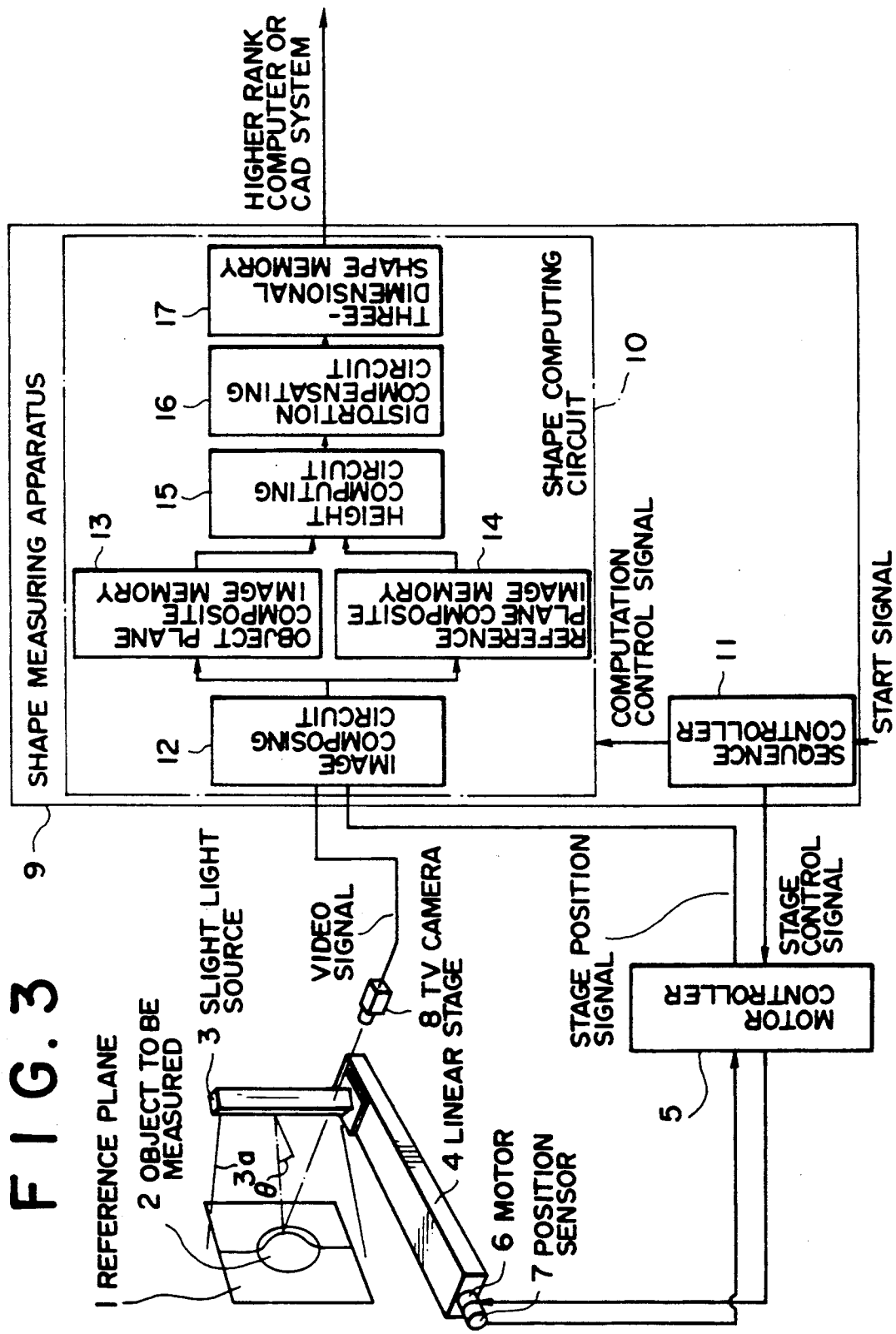

APPARATUS FOR MEASURING THREE-DIMENSIONAL CURVED SURFACE SHAPES

BACKGROUND OF THE INVENTION

The present invention relates to an apparatus for measuring three-dimensional curved surface shapes in a noncontact manner and more particularly to the compensation for distortions due to the perspective effect of its television camera.

Three-dimensional curved surface shape measuring apparatus have been proposed, for example, in U.S patent application Ser. No. 259,037. In these apparatus, the three-dimensional curved surface shape of an object to be measured is measured by scanning a linear slit light all over the surface of the object to form a composite image in which the value of each of the picture elements within the picture of a video signal produced by picking up the surface of the object is represented by information relating to the position of the slit light at the instant that the slit light passes one of the positions on the object surface corresponding to that picture element and subjecting the composite image to a computational processing.

However, this shape computing method is based on the tacit assumption that the distance between the television camera and an object to be measured, infinitely great or can be considered to be infinitely great. Where the distance between the television camera and the object to be measured is finite and the perspective effect cannot be ignored when observing the object from the television camera as in the actual measuring system, there is a disadvantage that if this shape computing method is applied as such, distortions due to the perspective effect are caused in the shape measurement result obtained.

SUMMARY OF THE INVENTION

It is an object of the present invention to provide a three-dimensional curved surface shape measuring apparatus which is capable of eliminating the distortions due to the perspective effect of a television camera.

The three-dimensional curved surface shape measuring apparatus according to the present invention is directed to a measuring apparatus of the slit light linear scanning type. Then, in accordance with a composite image u(x', y') produced by image composing means when a slit light is scanned over the surface of an object to be measured, a measured or computed value $u_o(x', y')$ of a composite image with respect to a reference plane, a light projection angle $\theta$ with respect to the reference plane and a reference plane-television camera distance a, the required computational processing is performed to obtain a three-dimensional shape f(x, y) of the surface of the object which is free of the distortions due to the perspective effect of the television camera.

BRIEF DESCRIPTION OF THE DRAWINGS

FIG. 3 is a schematic block diagram showing the construction of a three-dimensional shape measuring apparatus of the slit light linear scanning type according to an embodiment of the present invention.

DESCRIPTION OF THE PREFERRED EMBODIMENTS

In order to facilitate the understanding of embodiments of the present invention, the apparatus disclosed in U.S. patent application Ser. No. 259,037 will be described briefly with reference to the drawings prior to the description of the present invention.

Figure 1:
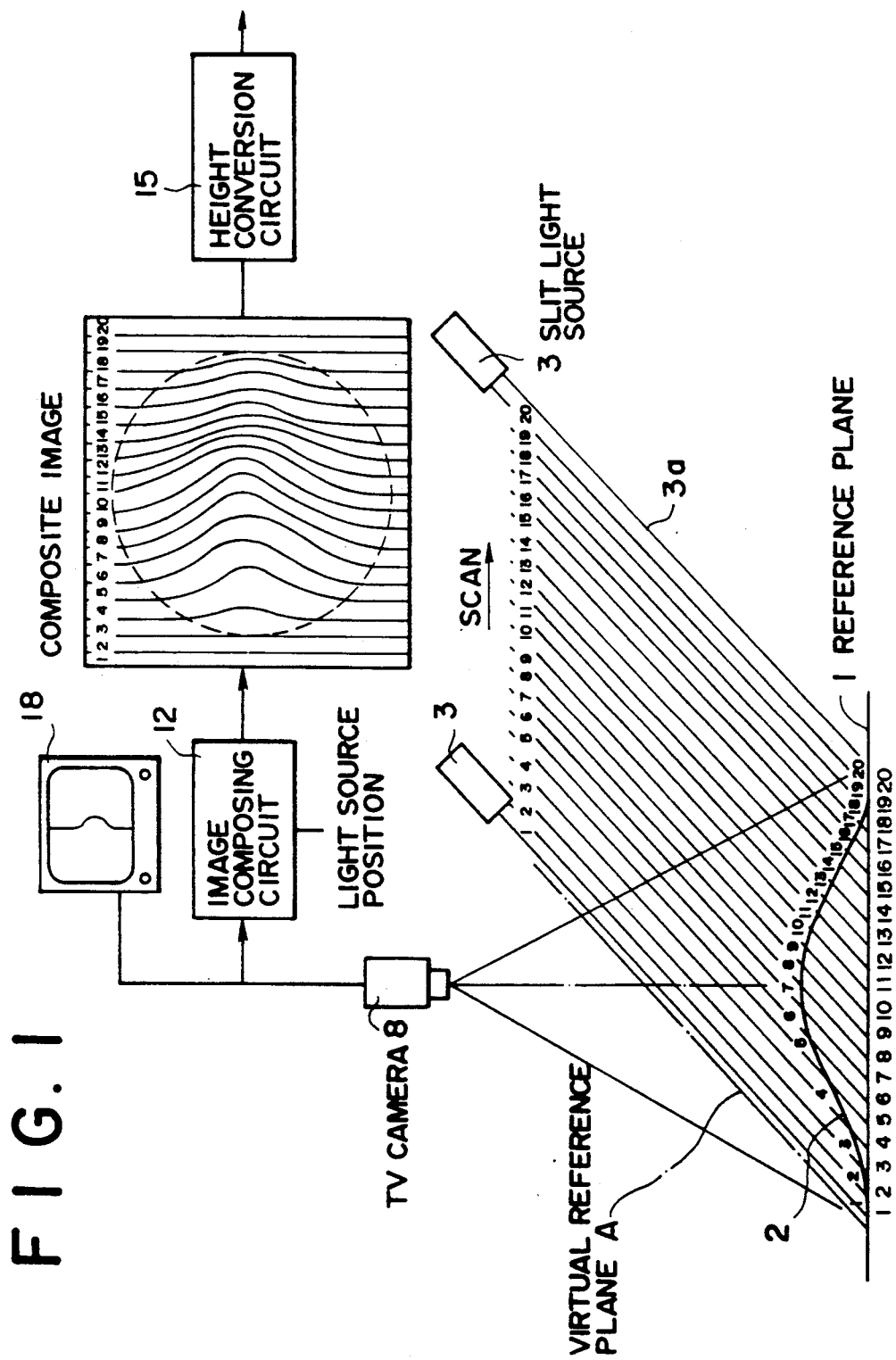
FIG. 1 is a schematic diagram showing the measuring principle of a three-dimensional shape measuring apparatus of the slit light linear scanning type disclosed in U.S. patent application Ser. No. 259,037.

FIG. 1 is a schematic diagram showing the measuring principle of the three-dimensional curved surface shape measuring apparatus of the slit light linear scanning type disclosed in U.S. patent application Ser. No. 259,037.

As shown in FIG. 1, a slit light 3a spreading vertically to the paper plane is projected obliquely from above onto the surface of an object 2 to be measured which is placed on a reference plane 1. Then, while moving the slit light 3a transversely to the paper plane, the object 2 is picked up by a television camera 8 from, for example, just above the object 2. At this time, the manner in which the linear reflected pattern of the slit light at the object surface is moved transversely to the picture is observed on a monitor television 18 connected to the television camera 8.

The linear shape of the reflected pattern of the slit light 3a reflects the irregularity information of the object surface. In accordance with the video signal outputted from the television camera 8 picking up the manner in which the linear reflected pattern of the slit light 3a is moved over the surface of the object, a composite image is formed in which each of the picture elements within the picture has a value representing the moment at which the slit light passes through the position on the object surface corresponding to that picture element or the moment at which the brightness of that position becomes maximum.

With the composite image produced in this way, the values of its respective picture elements represent a height profile of the object surface based on a plane A (hereinafter referred to as a virtual reference plane) shown by the dot-and-dash line in FIG. 1. In this way, the height profile of the object surface based on the virtual reference plane A is measured.

However, generally the three-dimensional shape measurement of the object must measure the profile based on the reference plane I on which the object 2 to be measured is placed and not the profile with respect to the virtual reference plane A in FIG. 1.

In order to satisfy this requirement the previously mentioned measurement is first made with respect to the object surface, thus measuring its height profile based on the virtual reference plane A. Then, after the object to be measured has been removed, the same measurement is made with respect to the reference plane 1, thus measuring a height profile based on the virtual reference plane A. Thereafter, the difference between each pair of corresponding picture element values of the two profile images, i.e., the object surface composite image u(x, y) and the reference plane composite image $u_o(x, y)$ is computed. As the result of this computation, a height profile image based on the reference plane 1 is produced. The value of each of the picture elements in this height profile image is proportional to the height of the corresponding position on the surface of the object to be measured which is based on the reference plane 1.

However, where the perspective effect of the video camera is not negligible, the present shape computing method has the disadvantage of causing a height distortion and position distortion as mentioned previously.

Figure 2:
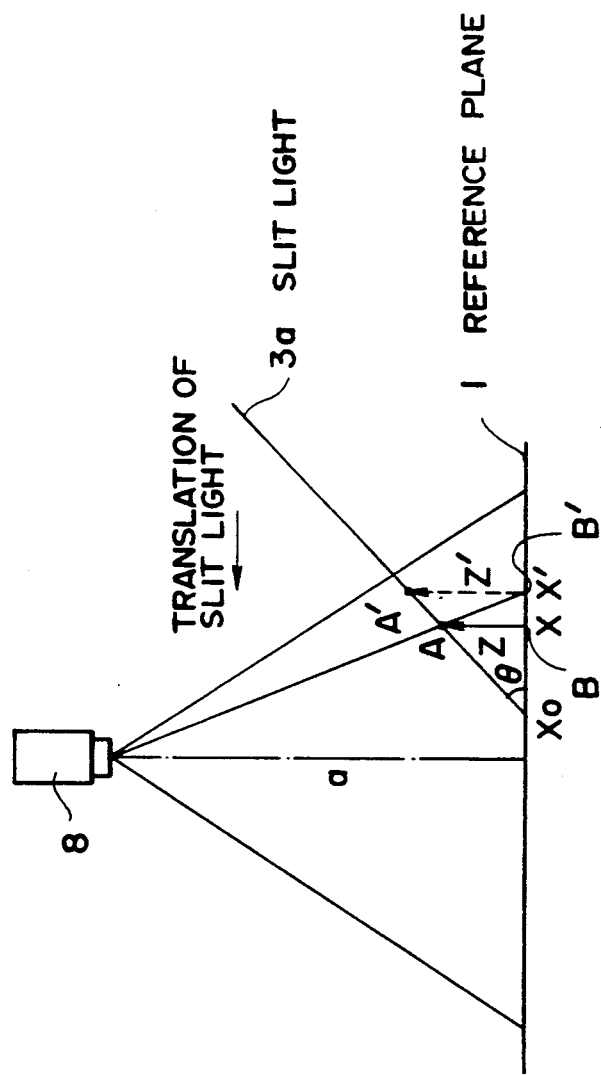
FIG. 2 is a diagram useful for explaining the measurement distortions in the shape measuring method of the slit light linear scanning type and the method of compensating for the distortions.

This disadvantage will now be explained with reference to FIG. 2. FIG. 2 is a diagram corresponding to the slit light linear scanning-type measuring method of FIG. 1. If the distance between the television camera 8 and the object 2 to be measured is infinitely great, the image of a point A to be measured on the reference plane 1 is observed at a point B. Then, considering the fact that the application of the shape computational expression disclosed in Japanese Laid-Open Patent No. 63-76389, $f(x, y) = u_o(x, y) - u(x, y) \tan \theta$, results in $u_o(x, y) = x_o$, $u(x, y) = x$, we obtain $f(x, y) = (x_o - x) \tan \theta$ and this corresponds to the height z of the point A.

However, where the distance between the television camera and the object to be measured is finite and the perspective effect of the camera is not negligible, the following two attributive distortions are caused.

(1) The height distortion: While the height z of the point A should properly be measured, what is measured is the height z' of a point A' which is the intersecting point between the slit light plane and the perpendicular drawn from the reference plane at the image point B' of the point A on the reference plane.

(2) The position distortion: While the coordinate x of the point A on the reference plane should properly be the coordinate x of the point B, it is measured to be the coordinate x' of the point B' and the coordinate x' varies depending on the height of the point A.

The background of the present invention has been made clear by the foregoing description and the distortion compensating method according to the present invention for use in the system of Ser. No. 259,037 will now be described.

(1) The height distortion compensation

The height z of the point A in FIG. 2 is given by the following equation derived from FIG. 2.

$$z = (x - x_o) \tan \theta \tag{1}$$

However, the point of projection of the point A on reference plane is the point B' and therefore the height of the point A is outputted as follows in accordance with the previously mentioned conventional method:

$$z' = (x' - x_o) \tan \theta \tag{2}$$

To compensate for this distortion, it is only necessary that the proper coordinate x of the point A on the reference plane be computed from the actually observed projective coordinate x of the point A on the reference plane. The relation between x' and x can be obtained in the form of the following equation (3) by a simple geometric calculation from FIG. 2 (a = the reference plane − television camera distance):

$$x = \left(1 - \frac{z}{a}\right) x' \tag{3}$$

By substituting equation (3) in equation (1) and simplifying it, the height z of the point A can be given in the following form:

$$z = \frac{x' - x_o}{1 + \frac{x'}{a} \tan \theta} \tan \theta \tag{4}$$

In equation (3), $x_o$ corresponds to the composite image $u(x', y')$ produced by scanning the slit light over the surface of the object to be measured and x' corresponds to the composite image $u_o(x', y')$ with respect to the reference plane. Therefore, equation (4) can be easily generalized and the shape computational expression compensated for the height distortion can be obtained in the form of the following equation:

$$z(x',y') = \frac{u_o(x',y') - u(x',y')}{1 + \frac{u_o(x',y')}{a} \tan \theta} \tan \theta \tag{5}$$

(2) The position distortion compensation

Although the true height of the point A has been determined by equation (5), the position coordinates of the point A are the coordinates (x', y') of the projective point B' to the point A on the reference plane centering the camera lens and not the coordinates (x,y) of the projective point B of the point A in the rectangular coordinate system.

This coordinate distortion can be compensated for by the following equations as will be readily understood from FIG. 2.

$$x = \left(1 - \frac{z(x',y')}{a}\right) x' \tag{6}$$

$$y = \left(1 - \frac{z(x',y')}{a}\right) y' \tag{7}$$

(3) The shape computing expression

By using the above-mentioned height and position distortion compensation expressions (5), (6) and (7) and considering the compensation for the perspective effect of the camera, the shape computational expression for the three-dimensional shape f(x, y) of the surface of the object to be measured can be given by the following equations:

$$f(x, y) = z(x', y') \tag{8}$$

FIG. 3 is a schematic block diagram showing the construction of a three-dimensional shape measuring apparatus of the slit light linear scanning type according to an embodiment of the present invention. An object 2 to be measured is mounted on a reference plane 1 serving as a basis of measurement. A slit light source 3 is mounted on a linear stage 4 and it projects a slit light 3a at a projection angle θ onto the reference plane 1 and the object 2 to be measured. With the slit light source 3 mounted on it, the linear stage 4 is driven by a motor 6 which is controlled by a motor controller 5 and the slit light source 3 is moved in a direction parallel to the reference plane 1.

At this time, the position of the slit light source 3 is measured by a position sensor 7 incorporated in the linear stage 4 and it is applied to a shape measuring apparatus 9 through the motor controller 5.

The reference plane 1 and the object 2 to be measured are picked up by a television camera 8 arranged such that its optical axis crosses the reference plane I at right angles and the resulting video signal is applied to the shape measuring apparatus 9.

The shape measuring apparatus 9 mainly comprises a shape computing circuit to serving as image computing means for performing a shape computation by image composing and a sequence controller 11 for generating commands for the motor controller 5 and performing a computation timing control for the shape computing circuit 10.

During the shape measurement, the shape measuring apparatus 9 drives the linear stage 4 through the sequence controller 11 responsive to an externally applied start signal and the slit light source 3 is set in its initial position. Thereafter, the scanning of the slit light source 3 is started.

The shape computing circuit 10 includes in its input section an image composing circuit 12 as disclosed in U.S. patent application Ser. No. 259,037 so that at the same time that the scanning of the slit light source 3 is started, the video signal applied from the television camera 8 is processed from moment to moment and an image composing computation is performed in which the value of each of the picture elements within the picture is represented by a stage position signal at the instant that the image of the slit light passes through that picture element. Then, upon the completion of one scanning of the slit light source 3, its result u(x', y') is transferred to an object plane composite image memory 13.

Then, after the object 2 has been removed from the reference plane I, the sequence controller 11 returns the slit light source 3 to the initial position and the scanning of the slit light source 3 is started again. The image composing circuit 12 performs the same composing computation as performed with respect to the object 2 but this time for the reference plane 1 so that upon completion of the slit light source scanning, the result u₀(x', y') is transferred to a reference plane composite image memory 14.

After these image composing computations have been completed, in response to the commands from the sequence controller 11 the shape computing circuit 10 causes a height computing circuit 15 and a distortion compensating circuit 16 to perform the following computations. The height computing circuit 15 computes a height z(x', y') from the image data stored in the object plane composite image memory 13 and the image data stored in the reference plane composite image memory 14 in accordance with equation (5). Thereafter, the distortion compensating circuit 16 provides compensation for the distortions in accordance with equations (6), (7) and (8) and the resulting height profile data f(x, y) is stored in a three-dimensional shape memory 17.

In response to the command from a higher rank computer or CAD system, the height profile data stored in the three-dimensional shape memory 17 is suitably transferred to the computer or the CAD system.

It is to be noted that while, in the above-described embodiment, the composite image of the reference plane 1 is produced during the measurement, it is necessary to produce the composite image of the reference plane 1 only once and therefore the initially produced composite image of the reference plane 1 can be used as such during the second and following measurements. Also, the composite image of the reference plane I is simple in construction so that the shape computing circuit 10 may be provided with an additional computing function such that a virtual reference plane is obtained by calculation in accordance with equation (5) to produce and store its composite image in the reference plane composite image memory 14.

Further, while in the above-described embodiment the stage position signal is directly used as a composing signal in the image composing circuit 12, assuming for example that the stage is caused to make an uniform motion, any signal corresponding to the stage position, e.g., the elapsed time since the starting of the scanning of the stage, can be used and the stage position signal itself need not be used particularly. In this case, however, a stage position conversion circuit must be provided after the image composing circuit 12.

What is claimed is:

1. An apparatus for measuring the shape of a three-dimensional curved surface of an object, comprising:
    slit light projecting means for projecting a linear slit light over the surface of said object placed on a measuring reference plane from a direction forming with said measuring reference plane an angle $\theta$ which is not perpendicular thereto;
    a television camera for picking up the surface of said object from a direction different than said direction of said projected slit light;
    image composing means for receiving an output of said television camera to compose in composite image memory means an image in which the value of each of picture elements is represented by information about the slit light source at each instance when said projected slit light passes through one of measuring points corresponding to each said picture element, thereby forming a composite image of the surface of said object; and
    shape computing means which includes:
    height computing means for computing height data $z(x', y')$, which is free of a distortion due to a perspective effect of said television camera, in accordance with said composite image $u(x',y')$ produced by said image composing means when said projected slit higher is scanned over the surface of said object, a measured value or computed value $u_0(x', y')$, of a composite image with respect to said measuring reference plane, a light projecting angle $\theta$ relative to said measuring reference plane, and a distance a between said measuring reference plane and said television camera;
    distortion compensating means for compensating two-dimensional coordinates (x'y') of said height data $z(x', y')$ produced by said height computing means in accordance with said height data $z(x', y')$ and said distance a between said reference plane and said television camera; and
    memory means for storing said height data subjected to said two-dimensional coordinates compensated by said distortion compensating means as three-dimensional shape data of said object.

2. A measuring apparatus as in claim 1, wherein said shape computing means determines the three-dimensional curved surface shape of the surface of said object in accordance with the following equations:

$$f(x,y) = z(x',y')$$

$$z(x',y') = \frac{u_0(x',y') - u(x',y')}{1 + \frac{u_0(x',y')}{a} \cdot \tan\theta} \cdot \tan\theta$$

-continued $$x = \left(1 - \frac{z(x',y')}{a}\right)x'$$

$$y = \left(1 - \frac{z(x',y')}{a}\right)y'$$

3. A measuring apparatus as in claim 1, wherein said shape computing means further includes first memory means for storing said composite image u(x',y') of the surface of said object, and second memory means for storing said measured value or computed value $u_o(x', y')$ of a composite image with respect to said reference plane.

4. A measuring apparatus as in claim 3, wherein said measured value or computed value $u_o(x',y')$ of a composite value with respect to said reference plane is stored in said second memory means prior to said shape measurement.

* * * * *